Aug. 11, 1964     O. W. ROHN     3,143,766
PELLETIZING APPARATUS

Filed April 17, 1961     2 Sheets-Sheet 1

INVENTOR.
OWEN W. ROHN
BY
*Learman, Learman & McCulloch*
ATTORNEYS

Aug. 11, 1964  O. W. ROHN  3,143,766
PELLETIZING APPARATUS
Filed April 17, 1961  2 Sheets-Sheet 2

INVENTOR.
OWEN W. ROHN
BY
Learman, Learman + McCulloch
ATTORNEYS 3,143,766
PELLETIZING APPARATUS
Owen W. Rohn, Saginaw, Mich., assignor to Baker Perkins Inc., Saginaw, Mich., a corporation of New York
Filed Apr. 17, 1961, Ser. No. 103,311
5 Claims. (Cl. 18—12)

This invention relates to pelletizing apparatus and more particularly to mechanism for cutting extruded strands of plastic material into pellets as the strands are extruded.

Apparatus constructed in accordance with the invention is adapted to be associated with a housing from which plastic materials such as polystyrenes, polyethylenes, acrylics, polyvinyl chlorides, nylon, and the like, for example, may be extruded through an extruding die in a continuous strand or strands. The apparatus includes a rotary cutter having one or more blades which periodically traverse the face of the die and cut the emerging plastic strand or strands into substantially uniform pellets of predetermined length. The speed at which the cutter is driven will depend on the particular kind of material being extruded and upon the pellet length desired. When relatively short pellets are to be formed, the cutter is driven at a higher speed than when longer pellets are desired. The cutter includes one or more blades having beveled surfaces terminating in cutting edges, and rotation of the cutter at relatively high speeds will develop an air thrust which tends to deflect the cutting edges of the blades so that the cutting edges of the blades do not remain coplanar with the face of the extruding die. When it is found that the cutting blades have deflected, it may be desirable to shift the cutter axially so as to provide more clearance between the cutting edges of the blades and the die face and to shift the axis of rotation of the cutter so as to reposition the cutting edges of the blade more nearly parallel to the die face. If adjustments of these kinds cannot be made when the cutter is rotating, it is necessary to shut down the apparatus and make adjustments of the cutter emperically. Adjustments made in this manner not only are time consuming but are far from precise.

An object of this invention is to provide a pelletizing apparatus including an extruding die through which strands of plastic material may pass into the path of a rotating cutter and in which the position of the cutter relative to the die may be varied precisely during rotation of the cutter.

Another object of the invention is to provide adjusting mechanism for a cutter mechanism of the kind described which is capable of effecting universal adjustment of the cutter.

A further object of the invention is to provide an adjustable cutting mechanism of the character described which is adjustable both axially and laterally by mechanism which is accessible and operable during operation of the mechanism.

Other objects and advantages of the invention will be pointed out specifically or will become apparent from the following description when it is considered in conjunction with the appended claims and the accompanying drawings, in which:

Figure 2:
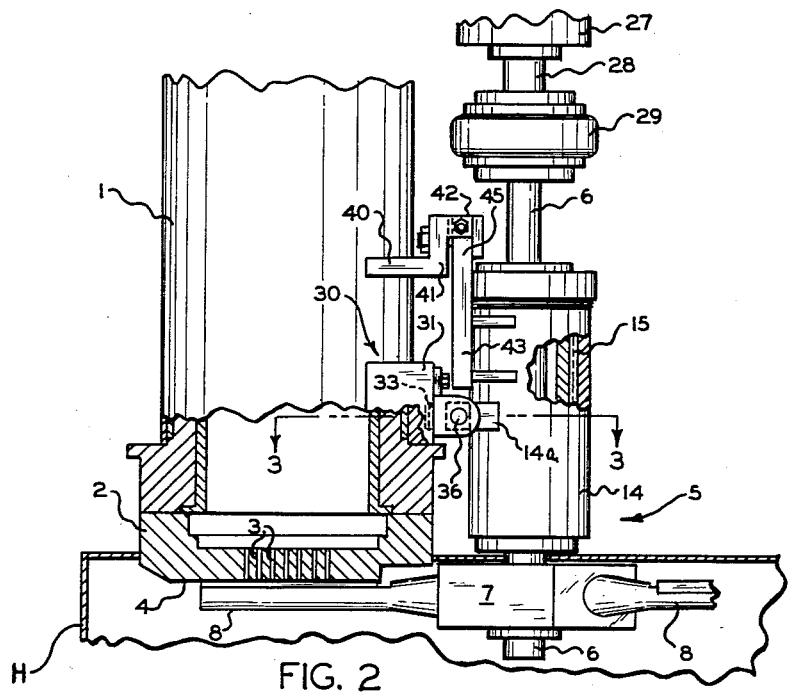
FIGURE 2 is a view, partly in top plan and partly in section, of the apparatus shown in FIGURE 1.

Apparatus constructed in accordance with the invention is adapted for use with an extruder 1 which may be any one of a number of conventional plastic pumps capable of delivering plastic material at the proper viscosity, temperature, and pressure. For illustrative purposes the extruder is disclosed as having a cylindrical body fitted at one end with a die 2 having a plurality of orifices 3 therein through which material from within the body 1 may be extruded in strand-like form. The body 1, the extruding die 2 and the means by which material is forced through the extruding die are conventional, and preferably the outer surface 4 of the extruding die is flat over a substantial portion of its area.

Rotary cutter means for cutting extruded strands of material into substantially uniform pellets is designated generally by the reference character 5 and comprises a rotatable shaft 6 adjacent one end of which is secured a socket member 7 in which is fixed a plurality of generally radially extending cutting blades 8. Each blade has a shaft 9 which is adjustably received in the socket member 7 and retained therein by a clamp 10 which is fixed to the socket member by suitable means such as screws 11. The blades may be adjusted inwardly or outwardly of the socket member and they may be adjusted about their own axes so as to position the cutting edges 12 of the blades at such an angle to the die face as to assure clean cutting of the pellets and to prevent the cut pellets from sticking to the blade, as well as to avoid uniting of the pellets before they have had an opportunity to cool sufficiently to prevent their agglomerating.

Figures 4, 5:
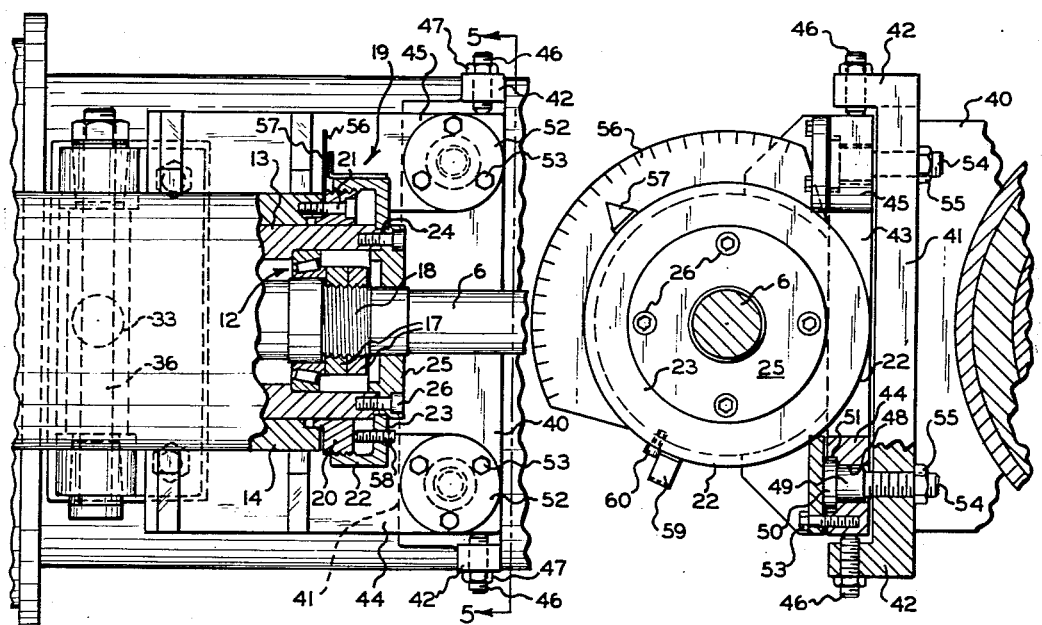
FIGURE 4 is a fragmentary, side elevational view, partly in section.
FIGURE 5 is a sectional view taken on the line 5—5 of FIGURE 4.

The cutter shaft 6 is journaled by two identical sets of bearing assemblies 12 in a cylinder or sleeve 13, one of the bearing assemblies being shown in FIGURE 4. The cylinder is slideably received within a cylindrical housing 14, but is restrained against rotation relative to the housing by means of a key 15 which is slideably received in a keyway 16 formed in the housing 14. The bearing assemblies are restrained against movement axially of the shaft by lock nuts 17 fitted onto threaded portions 18 of the shaft 6. The shaft 6 and the sleeve 13 are adjustable longitudinally as a unit, however, by an adjusting mechanism designated generally by the reference character 19.

The longitudinal adjusting mechanism 19 comprises an annulus 20 which is slideably mounted on the cylinder 13 and is fixed to the housing 14 by a number of screws 21. The periphery of the annulus 20 is threaded and receives a correspondingly threaded adjusting nut 22. The nut 22 has a radial flange 23 which is rotatably trapped in a groove 24 formed partly in the cylinder 13 and partly in a rear cap 25 which is secured to the cylinder by suitable screws 26.

The shaft 6 is adapted to be rotated by an electric motor 27 having a driven shaft 28 which is coupled to the shaft 6 by means of a tubular rubber or other flexible coupling element 29 of known construction which will transmit driving force to the shaft 6, but permit axial movement of the latter relative to the motor shaft 28. Rotation of the shaft 6 will cause rotation of the socket member 7 and consequently rotation of the cutter blades 8.

The purpose of the longitudinal adjusting mechanism 19 is to permit the cutter assembly to be adjusted axially of the shaft 6 so as to position the cutting edges 12 of the knives 8 a desired distance forwardly of the outer surface 4 of the die 2. Preferably, the cutter mechanism will be so positioned that the cutting edges 12 of the knives have a bare clearance with the die 2 so as to avoid undue wear of the cutting edges while still permitting the knives easily to slice through strands of material extruded from the body 1.

The length of the pellets formed by the apparatus will depend on the velocity of the material being extruded and the number of cuts made per unit of time.

The speed at which one kind of material is extruded and pelletized may not be the most efficient speed for another kind of material, so the motor 27 preferably is variable in speed or connected to the shaft 28 through a variable speed intermediate unit to permit variations in speed of rotation of the cutting knives.

It has been found that an air thrust is developed during high speed rotation which deflects the blades to some extent dependent on the speed of rotation. The region of greatest deflection of the blades is at their radially outer ends or tips inasmuch as the blades are at their tips most remote from any support. For example, rotation of the blades 8 counterclockwise, as viewed in FIGURE 1, at linear speeds on the order of 500 feet per minute, will cause the radially outer ends of the blades 8 to be deflected towards the die 2.

When the adjusting mechanism 19 is actuated to provide the desired clearance between the tip of the blades and the die, there may be an excessive clearance between the blade and the die in the region of the die orifices 3. In order to compensate for the tendency of the blades to deflect, universally adjustable mounting means 30 is provided to shift the axis of rotation of the cutter assembly relatively to the die an amount sufficient to take up the objectionable clearance.

The adjusting means 30 comprises a mounting block 31 fixed to the extruder body 1 and having a circular opening 32 therein. The opening 32 rotatably receives a projection 33 formed on the base of a plate 34 having a pair of upstanding trunnions 35 that receive a rock shaft 36 which extends through an opening formed in a laterally projecting block 14a on the cylinder 14. The shaft 36 is provided with a head 37 at one end and is threaded at its other end for reception of a nut 38. The parts 37 and 38 react with tapered bearing members 39 and fix or maintain the shaft against longitudinal movement.

Figure 1:
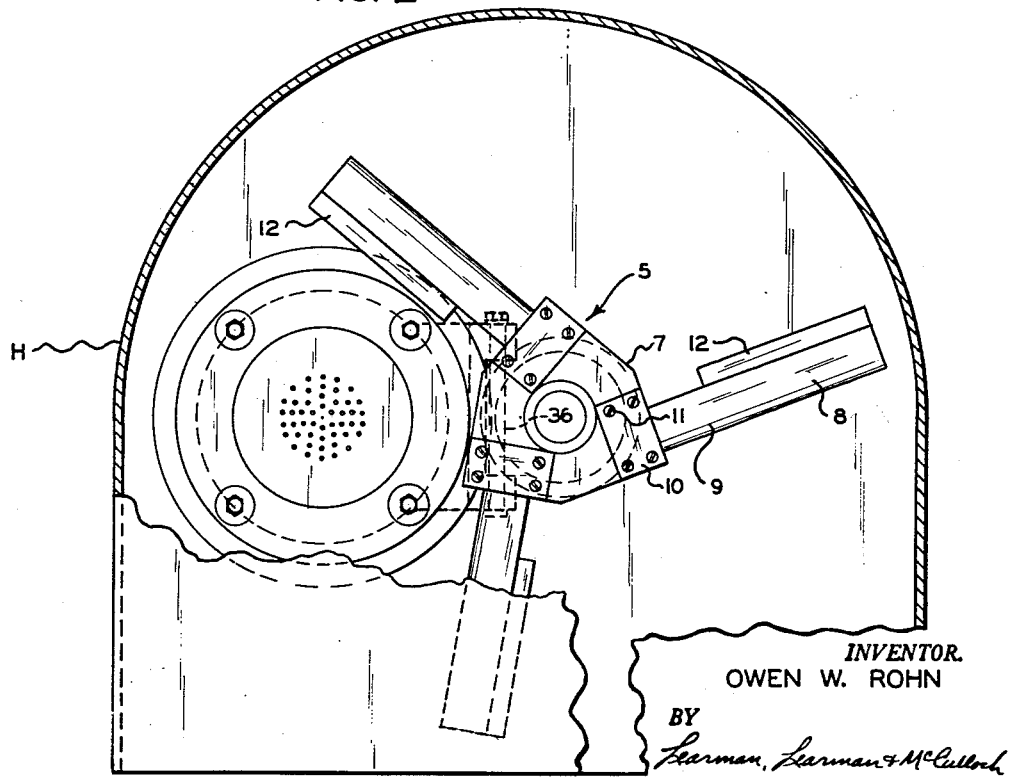
FIGURE 1 is a fragmentary, front elevational view, partly in section, of pelletizing apparatus constructed in accordance with the invention.
Figure 3:
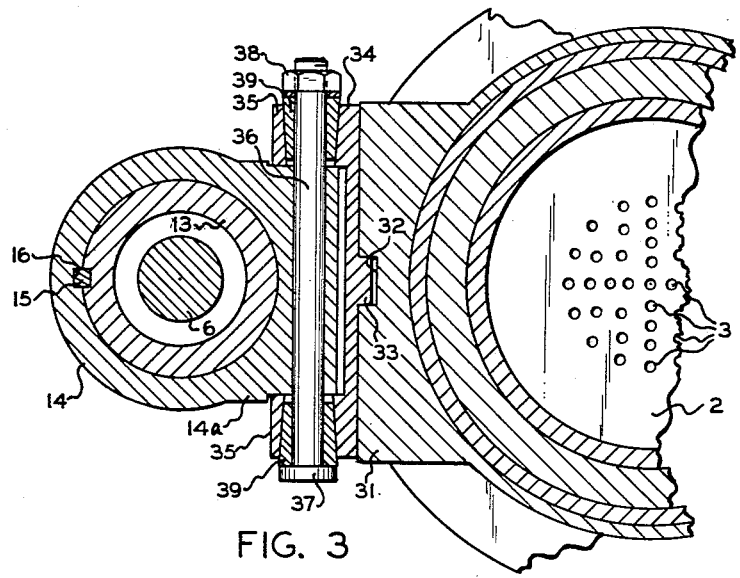
FIGURE 3 is an enlarged, sectional view taken on the line 3—3 of FIGURE 2 and rotated through 180°.

As is indicated in FIGURES 1 and 4, the shaft 36 mounts the cutter mechanism for rocking movements about a substantially vertical axis and the projection 33 mounts the cutter mechanism for rocking movements about a substantially horizontal axis. Since the cutter mechanism is mounted for rocking about both horizontal and vertical axes, the cutter mechanism 5 can partake of universal adjustment.

Apparatus for adjusting the cutter mechanism about the horizontal and vertical axes is provided and includes a bracket mounted on the extruder body 1 rearwardly of the block 31. The bracket includes a flange 41 having a pair of ears 42 at its opposite ends. Rigidly secured to the housing 14 is a plate 43 which has a pair of rearwardly extending legs 44 and 45. One of the legs, 44, is located adjacent one of the ears 42 and the other leg, 45, is located adjacent the other ear 42. Each of the ears 42 is provided with a threaded opening in which is received a threaded adjusting screw 46 which bears against the associated leg 44, 45 of the plate 43. The screws 46 may be adjusted so as to rock the cutter assembly 5 about the axis of the projection 33 and thereby shift the axis of rotation of the cutter relatively to the die. The cutter assembly may be locked or maintained in its adjusted position by nuts 47 mounted on each of the adjusting screws 46.

As is best shown in FIGURE 5, each of the legs 44, 45 of the plate 43 is provided with a bore 48 in which is received a bolt 49 having a head 50 at one end. The head of each bolt is received in a counterbore 51, and both the bore and the counterbore are larger than the corresponding parts of the bolt. On each leg 44, 45 is a clamp plate 52 that overlies the head of the associated bolt and is secured to its respective leg by means of suitable screws 53. Each bolt 49 has a threaded shank 54 on which is received an adjusting nut 55. The nuts 55 may be adjusted so as to effect rocking movement of the cutter assembly about the axis of the shaft 36 and thereby shift the axis of rotation of the cutting blades relatively to the die 2. The bores 48 and counterbores 51 are larger than the portions of the nuts received therein, so as to permit operation of the adjusting screws 46 to adjust the cutter mechanism without interference from the bolts 49.

Each of the adjusting devices associated with the cutter mechanism is accessible to the machine operator and is operable during rotation of the cutting blades. As a result, the time required to condition the apparatus for pelletizing operation is materially less than it would be if the adjusting devices could not be operated during rotation of the cutters. Moreover, the accessibility of the adjusting devices during rotation of the cutters enables the axis of rotation of the cutters and the clearance between the cutting edges and the die face to be precisely adjusted.

Experience with a particular machine constructed in accordance with the invention will enable an operator to know that for a particular speed of rotation of the cutters the deflection of the blades will necessitate a particular axial position of the cutter mechanism. To facilitate setting the cutters initially in the desired position, an indicator scale 56 may be fixed between the annulus 20 and the end wall of the housing 14 for use in conjunction with a pointer 57 secured to the adjusting nut 22.

Means is provided for locking or maintaining the cutter mechanism 5 in axially adjusted position and comprises a set screw 58 (FIGURE 4) which is adapted to react between the adjusting nut 22 and the annulus 20 to prevent creeping of the cutter blades 8 away from the die 2. If desired, a stop 59 may be fixed to the outer wall of the housing 14 for engagement by a pin 60 for the purpose of preventing overadjustment of the cutter assembly to a position such that the blades could engage the die an undesirable amount.

When the apparatus is in operation, the cutter mechanism will rotate and cause the blades 8 to traverse the die face 4 and sever the emerging strands of extruded material into uniform pellets. To catch the pellets, a hood H may be fixed in a position to surround the die and the cutters. Should any adjustment of the cutter assembly be desired, the machine operator may manipulate the several adjusting mechanisms during rotation of the blades and observe the effect of the adjustments to satisfy himself that the cutter assembly is properly adjusted.

The disclosed embodiment is representative of the presently preferred embodiment of the invention but is intended to be illustrative rather than definitive thereof. The invention is defined in the claims.

What is claimed is:

1. Pelletizing apparatus comprising rotary cutter means having at least one blade; means mounting said cutter means for rotation about an axis; an extruding die mounted adjacent said cutter means and through which material to be pelletized may pass into the path of rotation of said blade; pivotal means mounting said cutter means for movement relative to said die; and actuating means for said pivotal means operable during rotation of said cutter means to adjust the latter relatively to said die and to maintain said cutter means in adjusted position relative to said die.

2. Pelletizing apparatus comprising rotary cutter means having at least one blade; means mounting said cutter means for rotation about an axis; an extruding die mounted adjacent said cutter means and through which material to be pelletized may pass into the path of rotation of said blade; pivotal means mounting said cutter means for rocking movement relative to said die; adjustable means mounting said cutter means for linear movement along its axis of rotation; first actuating means connected to said pivotal means and operable during rotation of said cutter means to rock the latter relatively to said die; and second actuating means connected to said adjustable mounting means and operable during rotation of said cutter means to adjust the latter longitudinally toward and away from said die.

3. Pelletizing apparatus comprising rotary cutter means having at least one blade; universally adjustable means mounting said cutter means for rotation about three normal axes; an extruding die through which material to be pelletized may pass into the path of rotation of said blade; and actuating means connected to said mounting means and operable at all times to adjust the latter relatively to any or all of said axes and maintain said mounting means in adjusted position.

4. Pelletizing apparatus comprising rotary cutter means having at least one blade; adjustable means mounting said cutter means for rotation about a first axis; pivotal means mounting said cutter means for rotation about a second axis; an extruding die through which material to be pelletized may pass into the path of rotation of said blade; first actuating means operatively connected to the said cutter means for shifting the latter relatively to said first axis; second actuating means operatively connected to said cutter means for shifting the latter relatively to said second axis, said first and second actuating means being operable at all times during rotation of said cutter means; means mounting said cutter means for movement longitudinally of its axis of rotation; and third actuating means operatively connected to said cutter means for shifting the latter longitudinally of its axis of rotation.

5. Pelletizing apparatus comprising a housing; an extruding die at one end of said housing, said die terminating in a substantially planar outer face and through which material to be pelletized may pass; a shaft; means journalling said shaft for rotation about an axis; a cutter fixed on said shaft and having at least one blade rotatable about the axis of rotation of said shaft and across said face of said die to cut material passing therethrough; pivotal means mounting said shaft for rotation relatively to said housing about two axes normal to each other and to the axis of rotation of said shaft; and actuating means reacting between said housing and said pivotal means and operable during rotation of said cutter for adjusting the axis of rotation of said shaft relatively to said housing and to maintain said axis of rotation in adjusted position.

References Cited in the file of this patent

UNITED STATES PATENTS

| | | |
|---|---|---|
| 2,006,586 | Downard | July 2, 1935 |
| 2,149,920 | Kretchmer | Mar. 7, 1939 |
| 2,576,977 | Stober | Dec. 4, 1951 |
| 2,614,290 | Street | Oct. 21, 1952 |
| 2,629,132 | Willcox et al. | Feb. 24, 1953 |
| 2,757,621 | Johnson | Aug. 7, 1956 |
| 3,070,835 | Alsys | Jan. 1, 1963 |
| 3,090,992 | Schlachter et al. | May 28, 1963 |

FOREIGN PATENTS

| | | |
|---|---|---|
| 1,148,154 | France | Dec. 4, 1957 |